United States Patent
Starr

[15] 3,648,764
[45] Mar. 14, 1972

[54] COMFORT CONTROL SYSTEM FOR SPACE SUIT

[72] Inventor: James B. Starr, St. Paul, Minn.

[73] Assignee: The United States of America as represented by the Secretary of the Navy

[22] Filed: Nov. 25, 1970

[21] Appl. No.: 92,622

[52] U.S. Cl. ............................165/32, 73/362 R, 73/362.5, 73/362.6, 73/340, 236/78
[51] Int. Cl. ..........................................G05d 23/00
[58] Field of Search............236/78; 73/362 R, 362.5, 362.6, 73/340; 165/39, 32; 2/2.1

[56] References Cited

UNITED STATES PATENTS

| | | | |
|---|---|---|---|
| 1,358,073 | 11/1920 | Fulton | 236/10 |
| 2,208,267 | 7/1940 | Ridge | 73/362.5 X |
| 3,367,319 | 2/1968 | Carter | 2/2.1 R |

Primary Examiner—Albert W. Davis, Jr.
Attorney—R. S. Sciascia, H. H. Losche and Paul S. Collignon

[57] ABSTRACT

A comfort control system for a space suit having cooling passageways therein for circulating coolant. A temperature sensor is placed on an uncooled area of skin of a person wearing a space suit and a thermal path of fixed conductance is provided between the temperature sensor and one cooling passageway whereby skin temperature is reduced as said person's metabolic rate increases.

2 Claims, 3 Drawing Figures

PATENTED MAR 14 1972　　　　　　　　　　　　　　　　3,648,764

INVENTOR
JAMES B. STARR
BY H. H. Loscke
Paul S. Collignon
ATTORNEYS

COMFORT CONTROL SYSTEM FOR SPACE SUIT

CROSS-REFERENCES TO RELATED APPLICATION

Patent application of James B. Starr entitled, "Temperature Sensor for Space Suit," Ser. No. 96,874, filed Dec. 10, 1970.

BACKGROUND OF THE INVENTION

The present invention relates to a liquid-cooled garment and more particularly to a control system for a liquid-cooled garment for maintaining a comfortable thermal state for the person wearing the garment.

The function of a control system for a liquid-cooled garment is to maintain a comfortable thermal state for the person wearing the garment, and this function is automatic when the control system is able to sense some index of the person's thermal state and then modulate the temperature of cooling water flowing through passageway in said garment in response to changes in that index. A number of indexes can be used to measure the thermal state of a subject. For example, oxygen consumption, heat rate, and respiratory rate indicate, with varied degrees of accuracy, the rate of metabolic heat generation. While rectal, tympanic-membrane and skin temperatures indicate heat storage, skin temperature is considered the most practical index of a person's thermal state in automatic temperature control systems for space suits.

Effectiveness of a control system for a space suit depends on the functional relationship between skin temperature and cooling-water temperature. For example, in most closed-loop proportional systems, coolant temperature is varied inversely with changes in skin temperature by a relatively high gain factor. The net effect of such systems is to maintain skin temperature at a nearly constant value. Constant skin temperature, however, does not provide maximum comfort under all conditions. For example, investigations have indicated that means skin temperature of a person wearing a space suit should be reduced as his metabolic rate increases in order to provide maximum comfort. A reduction of skin temperature with increasing metabolic rate is equivalent to keeping a person's body in a neutral thermal state, that is, at a constant heat storage level. In order to maintain a comfortable thermal state, the control system should automatically reduce mean skin temperature as the person's metabolic rate increases. Depression of skin temperature as metabolic rate increases can be accomplished by keeping the rate of cooling in the vicinity of the sensor at a level less than the mean cooling rate of the liquid-cooled garment.

SUMMARY OF THE INVENTION

The present invention relates to a comfort control system for a garment, such as a space suit, and includes a temperature sensor which is to be placed on a small, uncooled area of skin. The difference between sensor temperature and cooled-skin temperature depends on the conductance of heat between the sensor and the cooling tubes. This conductance level will vary with the proximity of the sensor to the cooling tubes. In order to control the difference between the temperature of the sensor and the cooled area of the skin, a thermal path of a fixed conductance is provided between the cooling tubes and the temperature sensor.

DESCRIPTION OF THE PREFERRED EMBODIMENT

Figure 1:
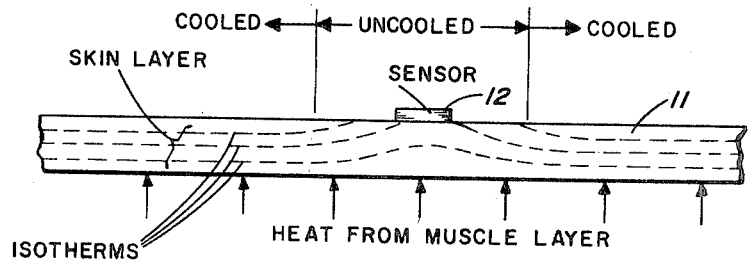
FIG. 1 is a diagram showing heat flow through a layer of skin.
Figure 2:
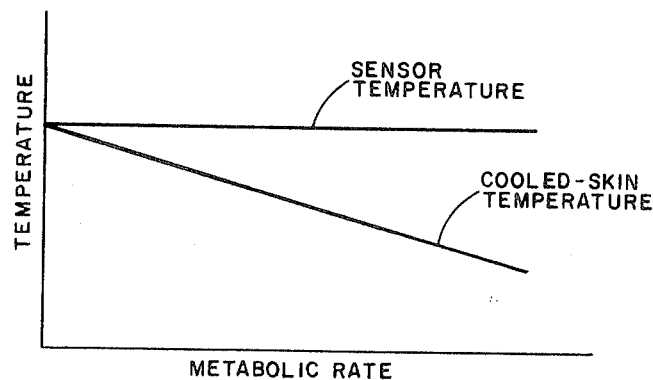
FIG. 2 is a graph showing a relationship between sensor temperature and cooled-skin temperature for changes in metabolic rate.

Referring now to the drawing, there is shown in FIG. 1 a diagram of heat flow from muscle layers through a skin layer 11. A temperature sensor 12 is placed on a small, uncooled area of skin 11 and, during exercise, heat is transferred from the muscle layers to the skin. The cooled area of the skin will be at a lower temperature than that of the temperature sensor 12. The difference between the cooled area temperature and the uncooled area temperature tends to increase with heat generated in the muscle layers beneath the skin. If the skin temperature sensor 12 is incorporated in a high-gain proportional-feedback loop, coolant temperature is automatically modulated to keep the temperature of sensor 12 at a nearly constant value. As shown in FIG. 2 of the drawing, the skin temperature beneath sensor 12 remains essentially constant while the temperature of the cooled area of the skin is reduced as heat rejection increases.

The difference between sensor temperature and cooled-skin temperature depends on the conductance of heat between the sensor 12 and cooling tubes 14 which have passageways for a coolant 15. This conductance level will vary with the proximity of the sensor 12 to the cooling tubes 14. In addition, however, variations in the vascular properties of the skin layer will also affect the conductance level. Consequently, the difference between the temperature of sensor 12 and the cooled area of the skin will be difficult to control if conductance is only by the skin layer.

Figure 3:
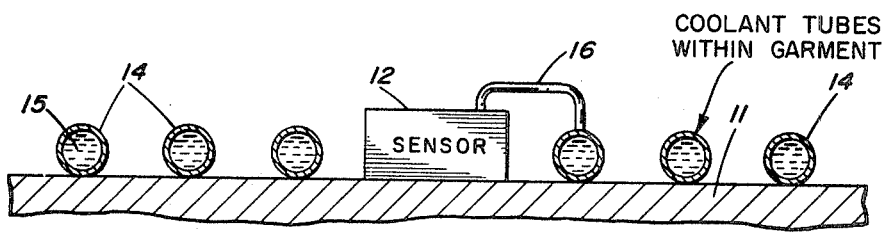
FIG. 3 is a side view, partly in section, showing a preferred embodiment of the present invention.

Referring now to FIG. 3 of the drawing, temperature sensor 12 is shown placed on an uncooled area of skin layer 11. A copper wire 16 is connected between one cooling tube 14 and sensor 12 and provides a thermal path of a fixed conductance value between the cooling tube and sensor 12. This arrangement facilitates adjustment of the extent of skin temperature depression as metabolic rate increases, that is, the extent of skin temperature depression will vary inversely with the conductance of the wire 16 that connects the sensor 12 to the cooling tube 14.

I claim:

1. A comfort control system in a space suit having a plurality of tubes each having a passageway for carrying coolant comprising,
   a temperature sensor adaptable to be placed on an uncooled portion of skin of a person wearing said space suit, and
   a thermal path of fixed conductance connected between said temperature sensor and one of said tubes whereby said temperature sensor provides an output signal for reducing said person's mean skin temperature as said person's metabolic rate increases.

2. A comfort control system in a space suit as set forth in claim 1 wherein said thermal path of fixed conductance is copper wire.

* * * * *